(12) United States Patent
Qiao et al.

(10) Patent No.: US 11,876,340 B2
(45) Date of Patent: Jan. 16, 2024

(54) LASER

(71) Applicant: SHANGHAI INSTITUTE OF MICROSYSTEM AND INFORMATION TECHNOLOGY, CHINESE ACADEMY OF SCIENCES, Shanghai (CN)

(72) Inventors: Shan Qiao, Shanghai (CN); Zhinan Zeng, Shanghai (CN); Xiaoyan Liang, Shanghai (CN)

(73) Assignee: SHANGHAI INSTITUTE OF MICROSYSTEM AND INFORMATION TECHNOLOGY, CHINESE ACADEMY OF SCIENCES, Shanghai (CN)

(*) Notice: Subject to any disclaimer, the term of this patent is extended or adjusted under 35 U.S.C. 154(b) by 0 days.

(21) Appl. No.: 17/625,780

(22) PCT Filed: Dec. 26, 2019

(86) PCT No.: PCT/CN2019/128717
§ 371 (c)(1),
(2) Date: Jan. 10, 2022

(87) PCT Pub. No.: WO2021/036133
PCT Pub. Date: Mar. 4, 2021

(65) Prior Publication Data
US 2022/0255289 A1     Aug. 11, 2022

(30) Foreign Application Priority Data
Aug. 29, 2019 (CN) .................. 201910808165.4

(51) Int. Cl.
*H01S 3/23* (2006.01)
*H01S 3/094* (2006.01)
*H01S 3/22* (2006.01)

(52) U.S. Cl.
CPC ...... *H01S 3/2316* (2013.01); *H01S 3/094096* (2013.01); *H01S 3/2207* (2013.01)

(58) Field of Classification Search
CPC ............ H01S 3/2316; H01S 3/094096; H01S 3/2207; H01S 3/094092; H01S 3/2366;
(Continued)

(56) References Cited

U.S. PATENT DOCUMENTS 4,399,539 A    8/1983  White
4,486,884 A   12/1984  White
(Continued)

FOREIGN PATENT DOCUMENTS

| CN | 106129792 A | 11/2016 |
|---|---|---|
| CN | 109471311 A | 3/2019 |
| WO | WO2001099247 | 12/2001 |

*Primary Examiner* — Xinning(Tom) Niu
(74) *Attorney, Agent, or Firm* — IPRTOP LLC

(57) ABSTRACT

The present invention provides a laser, including: a medium, having a ground state, an intermediate state, and an excited state in ascending order of energy; an excitation system, configured to excite electrons in the medium from the ground state to the intermediate state; and an excitation laser, configured to drive electrons in the intermediate state at different spatial positions in the medium to the ground state through a stimulated emission process with a fixed phase relationship, to generate a laser with a shorter relative wavelength. Due to the use of an excitation laser to drive electrons from the intermediate state, the photons generated by the stimulated emission have coherence, thereby forming a laser. In the present invention, an excitation system performing primary pumping combined with an excitation laser with a relatively long wavelength performing secondary pumping generate lasers with a relatively short wavelength, and the structure of the short-wavelength laser is simple, compact, and easy to be implemented. In addition, the cost
(Continued)

of the short-wavelength laser can be reduced, and a laser with a shorter wavelength can be obtained.

10 Claims, 2 Drawing Sheets

(58) Field of Classification Search
CPC ........ H01S 3/097; H01S 2302/00; H01S 3/09; H01S 3/094; H01S 3/23
See application file for complete search history.

(56) References Cited

U.S. PATENT DOCUMENTS

| | | | |
|---|---|---|---|
| 4,504,949 A | 3/1985 | White | |
| 6,525,868 B2* | 2/2003 | Merriam | G02F 1/3534 |
| | | | 359/326 |
| 8,698,399 B2* | 4/2014 | Bezel | G21B 1/23 |
| | | | 359/332 |
| 10,216,062 B2* | 2/2019 | Kiffner | G02F 1/353 |
| 2005/0031003 A1 | 2/2005 | Krupke | |
| 2007/0091968 A1* | 4/2007 | Wakabayashi | G03F 7/70025 |
| | | | 372/55 |
| 2015/0235829 A1* | 8/2015 | Chung | C23C 16/52 |
| | | | 250/288 |

* cited by examiner

LASER

CROSS REFERENCE TO RELATED APPLICATION

The present application claims the benefit of priority to Chinese Patent Application No. CN 201910808165.4, entitled "LASER", filed with CNIPA on Aug. 29, 2019, the disclosure of which is incorporated herein by reference in its entirety.

FIELD OF TECHNOLOGY

The present invention relates to the field of lasers, and in particular, to a laser using a long-wavelength excitation laser to generate a short-wavelength laser.

BACKGROUND

Since the advent of the world's first laser with the infrared (IR) spectral region, scientists have been making efforts to obtain a laser with a shorter wavelength. Currently, with the development of laser technologies, a laser wavelength has reached the deep ultraviolet (DUV) wave band. Ultraviolet (UV) lasers have important applications in scientific research, industry, and medical treatment, and account for a relatively fast growing part in the current laser market. In addition, with the development of nano-scale fabrication and modern scientific instruments such as ultra-high energy resolution photoelectron spectroscopy and photoelectron emission microscopy, the research on the DUV coherent light sources is also very urgent. Since the photon energy of DUV light is greater than 3 eV, the DUV light is strongly absorbed by resonant cavity material, making it impossible to use a conventional resonant cavity to form a laser. Therefore, most of the current DUV lasers are obtained through the non-linear effects generated by fundamental lasers with low energy photons. Due to a relatively low efficiency of non-linear process, high-power fundamental lasers are required, which results in large space size and high manufacturing cost of the lasers. Moreover, restricted by current used non-linear effects, the minimum photon wavelength of current DUV lasers can only reach 114 nm. In addition, electromagnetic field excitation systems have been widely applied to light source technologies currently. For example, through the electromagnetic interaction between an electromagnetic field and the helium atoms, helium atoms in a commonly used helium lamp that generates 21.2 eV DUV photons can be excited from $1s^2$ ground state to 1s2p ($^1P_1$) state. The decay from the 1s2p ($^1P_1$) exciting state to the ground state generates 21.2 eV DUV photons. However, the decay process that occurs in the helium lamp is a random spontaneous process. Therefore, the generated photons have no coherence and cannot form lasers.

Therefore, it is necessary to design a laser that combines two pumping processes by electromagnetic interactions and a long-wavelength laser to generate short-wavelength photons.

SUMMARY

The present invention provides a laser, configured to resolve the problems of large space volume, high cost, and low photon energy of a UV laser, especially, a DUV laser, caused by low efficiency of non-linear effects.

The present invention provides a laser. The laser at least comprises:

a medium, having a ground state, an intermediate state, and an excited state in ascending order of energy, where the excited state is a single level, multiple levels, or continuous levels state;

an excitation system, configured to excite electrons in the medium from the ground state to the intermediate state; and an excitation laser, configured to drive electrons in the intermediate state at different spatial positions in the medium to the ground state through a stimulated emission process to generate coherent photons to form a laser, where there are two ways for the stimulated emission process, the first way is to excite the electrons in the intermediate state to the excited state and drive the electrons in the excited state to the ground state, and the second way is to directly drive the electrons in the intermediate state to the ground state.

Optionally, the laser is a DUV laser.

Optionally, the intermediate state is a metastable state.

Optionally, the medium comprises a gas, a liquid or a solid.

Further, the medium comprises helium, neon, argon, krypton or xenon.

Further, the medium is helium, and energy of the intermediate state is 20.616 eV.

Optionally, the excitation system comprises an electromagnetic field excitation system or electron gun excitation system.

Further, the electromagnetic field excitation system comprises a static electromagnetic field excitation system, a pulsed electromagnetic field excitation system, an alternating current (AC) electromagnetic field excitation system, or a microwave excitation system.

Optionally, the excitation laser comprises a visible continuous wave laser, a visible pulsed laser, an IR continuous wave laser, an IR pulsed laser, a UV continuous wave laser or a UV pulsed laser.

Further, wavelengthes of the excitation laser comprise 329.86 nm, 335.60 nm, 344.90 nm, 361.52 nm, 396.67 nm, 501.6 nm, 2058.7 nm, and the wavelength shorter than 311.23 nm.

The present invention further provides an N-stage cascade laser, where the N-stage cascade laser at least comprises a first-stage laser and a subsequent N−1-stage laser;

the first-stage laser is any one laser described above;

a subsequent $i^{th}$-stage laser comprises:

an $i^{th}$-stage medium, having a ground state, an intermediate state, and an excited state in ascending order of energy, where the excited state is a single level, multiple levels, or continuous levels state;

an $i^{th}$-stage excitation system, configured to excite atoms in the $i^{th}$-stage medium from the ground state to the intermediate state;

an $i^{th}$-stage excitation laser, where the $i^{th}$-stage excitation laser is an $i-1^{th}$-stage laser, the photons generated by the $i^{th}$-stage excitation laser is used to drive the atoms in the intermediate state at different spatial positions in the $i^{th}$-stage medium to the ground state through a stimulated emission process with a fixed phase relationship, to emit coherent photons to form an $i^{th}$-stage laser, where there are two ways for the stimulated emission process, the first way is to excite the atoms in the intermediate state to the excited state and drive the atoms in the excited state to the ground state, and the second way is to directly drive the atoms in the intermediate state to the ground state; and N is an integer greater than or equal to 2, and i is an integer greater than or equal to 2 and less than or equal to N.

As described above, since the laser consistent with the present invention uses an excitation laser to drive electrons in an intermediate state to a ground state, the photons generated by stimulated emission process have coherence, thereby forming a laser. An excitation system performing primary pumping combined with an excitation laser with a relatively long wavelength performing secondary pumping generate a laser with a relatively short wavelength, and the structure of the short-wavelength laser is simple, compact, and easy to be implemented. In addition, the cost of the short-wavelength laser can be reduced, and a laser with a shorter wavelength can be obtained.

REFERENCE NUMERALS

1 Excitation laser
2 Medium
3 Parallel plate electrical excitation system
4 Microwave excitation system
5 Electron gun excitation system

DETAILED DESCRIPTION

The following describes implementations of the present invention by using specific embodiments. A person skilled in the art may easily understand other advantages and effects of the present invention from the content disclosed in this specification. The present invention may also be implemented or applied through different specific embodiments. Various details in this specification may also be modified or changed based on different viewpoints and applications without departing from the spirit of the present invention.

Figure 1:
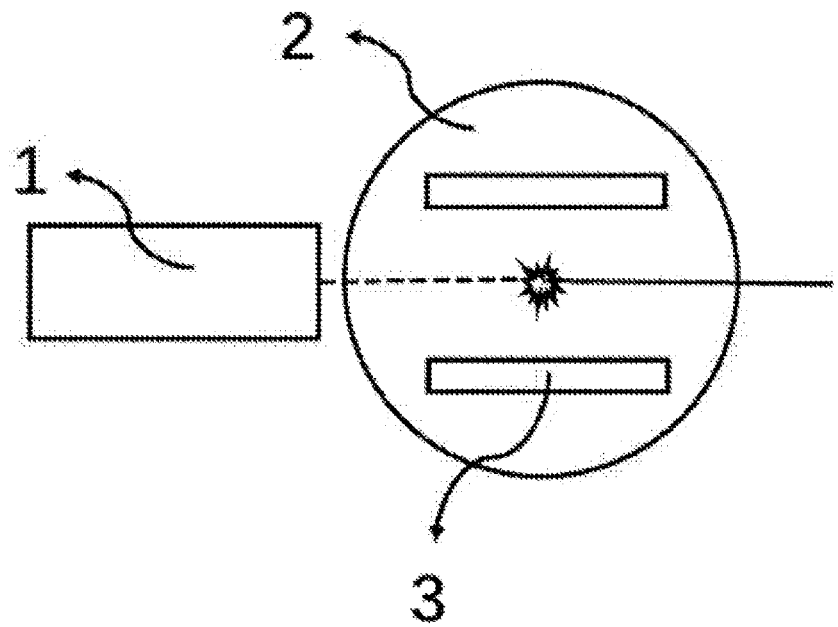
FIG. 1 is a schematic structural diagram of a laser according to Embodiment 1 of the present invention, where an excitation system is set as an electrical excitation system with parallel plates.
Figure 2:
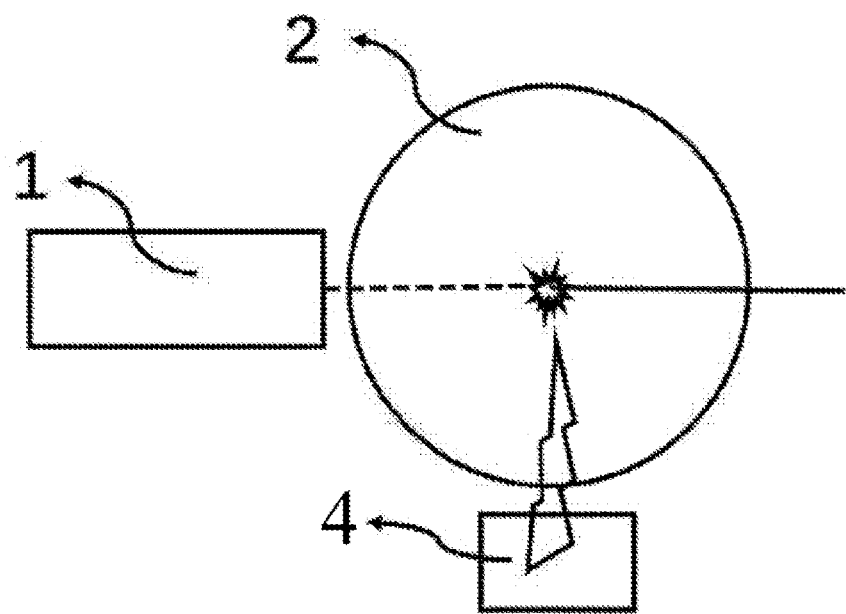
FIG. 2 is a schematic structural diagram of a laser according to Embodiment 2, Embodiment 4, and Embodiment 5 of the present invention, where an excitation system is set as a microwave excitation system.
Figure 3:
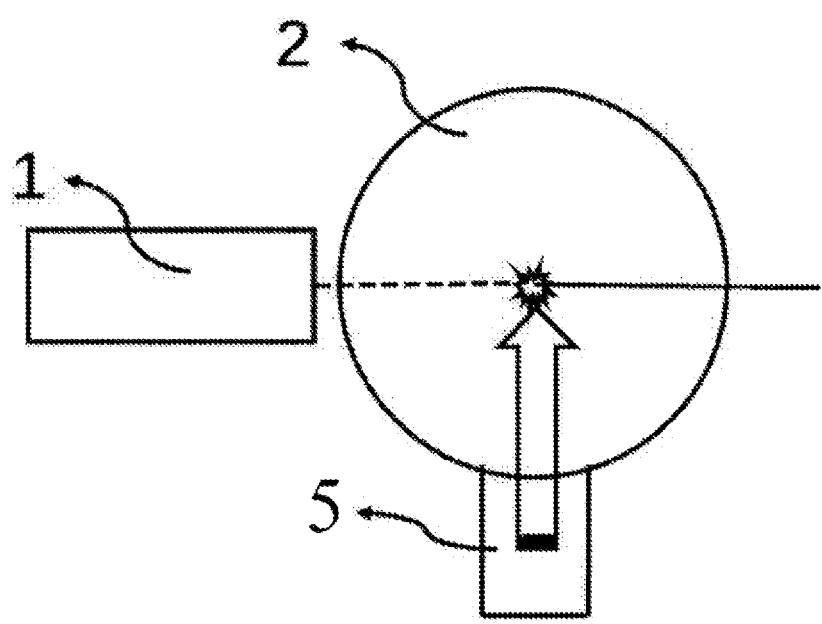
FIG. 3 is a schematic structural diagram of a laser according to Embodiment 3 of the present invention, where an excitation system is set as an electron gun excitation system.

Refer to FIG. 1 to FIG. 3. It should be noted that, the drawings provided in the embodiments only exemplify the basic idea of the present invention. Therefore, the drawings only show the components related to the present invention, and are not drawn according to the quantities, shapes, and sizes of the components during actual implementation. During actual implementation, the types, quantities, and proportions of the components may be changed at will, and the layout pattern of the components may be more complicated.

The present invention provides a laser. The laser at least comprises:

a medium, having a ground state, an intermediate state, and an excited state in ascending order of energy, where the excited state is a single level, multiple levels, or continuous levels state;

an excitation system, configured to excite atoms in the medium from the ground state to the intermediate state; and an excitation laser, configured to drive the atoms in the intermediate state at different spatial positions in the medium to the ground state through a stimulated emission process to generate coherent photons to form a laser, where there are two ways for the stimulated emission process, the first way is to excite the electrons in the intermediate state to the excited state and drive the atoms in the excited state to the ground state, and the second way is to directly drive the atoms in the intermediate state to the ground state.

A process of generating a laser by the laser consistent with the present invention is as follows: The excitation system excites the atoms in the medium from the ground state to the intermediate state, and the excitation laser drives the atoms in the intermediate state at different spatial positions in the medium to the ground state through the stimulated emission process with a fixed phase relationship. There are two ways for the stimulated emission process. The first way is to excite the atoms in the intermediate state to the excited state and drive the atoms in the excited state to the ground state. The second way is to directly drive the atoms in the intermediate state to the ground state. Excited photons undergone the stimulated emission process at different spatial positions have a fixed phase relationship. Therefore, when the atoms at different spatial positions decay from the intermediate state to the ground state through the stimulated emission process, coherent photons are emitted, that is, lasers are formed.

Since the excitation laser is used in the present invention to drive the electrons from the intermediate state to the ground state, the photons generated by the stimulated emission process have coherence, thereby forming lasers. In addition, an excitation system performing primary pumping combined with an excitation laser with a relatively long wavelength performing secondary pumping generate lasers with a relatively short wavelength, and the structure of the short-wavelength laser is simple, compact, and easy to be implemented. In addition, the cost of the short-wavelength laser can be reduced, and a laser with a shorter wavelength can be obtained.

In an example, the laser consistent with the present invention is easy to be prepared as a DUV laser. Preferably, the intermediate state of the medium is a metastable state. Therefore, the excitation system excites the atoms in the medium to the metastable state. Generally, a medium with the metastable state may selectively be a gas, a liquid or a solid. When the medium with the metastable state is selected as a gas, the medium is preferably an inert gas, for example, helium, neon, argon, krypton or xenon.

In an example, the excitation system comprises an electromagnetic field excitation system or electron gun excitation system. Preferably, the electromagnetic field excitation system comprises a static electromagnetic field excitation system, a pulsed electromagnetic field excitation system, an AC electromagnetic field excitation system, or a microwave excitation system.

In an example, the excitation laser comprises a visible continuous wave laser, a visible pulsed laser, an IR continuous wave laser, an IR pulsed laser, a UV continuous wave laser or a UV pulsed laser. Preferably, wavelengthes of the excitation laser comprise 329.86 nm, 335.60 nm, 344.90 nm, 361.52 nm, 396.67 nm, 501.6 nm, 2058.7 nm, and the wavelength shorter than 311.23 nm.

The present invention further provides an N-stage cascade laser, where the N-stage cascade laser is cascaded based on the laser mentioned above. That is, the laser formed by the foregoing structure is used as a first-stage laser. The structure of the laser mentioned above is used to form a second-stage laser, and the first-stage laser is used as the excitation laser of the second-stage laser. Then, the structure of the laser mentioned above is further used to form a third-stage laser, and the second-stage laser is used as the excitation laser of the third-stage laser, and so on. In this way, any laser structure with more than two stages can be formed. Specifically, the N-stage cascade laser comprises a first-stage laser and a subsequent N−1-stage laser;

the first-stage laser is the laser described above;

a subsequent $i^{th}$-stage laser comprises:

an $i^{th}$-stage medium, having a ground state, an intermediate state, and an excited state in ascending order of energy, where the excited state is a single level, multiple levels, or continuous levels state;

an $i^{th}$-stage excitation system, configured to excite atoms in the $i^{th}$-stage medium from the ground state to the intermediate state;

an $i^{th}$-stage excitation laser, where the $i^{th}$-stage excitation laser is an $i-1^{th}$-stage laser, the photons generated by the $i^{th}$-stage excitation laser is used to drive the atoms in the intermediate state at different spatial positions in the $i^{th}$-stage medium to the ground state through a stimulated emission process with a fixed phase relationship, to emit coherent photons to form an $i^{th}$-stage laser, where there are two ways for the stimulated emission process, the first way is to excite the atoms in the intermediate state to the excited state and drive the atoms in the excited state to the ground state, and the second way is to directly drive the atoms in the intermediate state to the ground state; and N is an integer greater than or equal to 2, and i is an integer greater than or equal to 2 and less than or equal to N.

The laser consistent with the present invention is described in detail below with reference to the accompanying drawings and specific embodiments. It should be noted that, a DUV laser and an extreme ultraviolet (EUV) laser are used as an example for description in the embodiments below, which does not indicate that the laser consistent with the present invention can only be a UV laser. The present invention can also construct other lasers with a wavelength shorter than that of an EUV photon.

Embodiment 1

FIG. 1 is a schematic structural diagram of a laser according to this embodiment. The medium 2 is helium. The excitation system is a parallel plate electrical excitation system 3 formed by two parallel plates and a power supply. The excitation laser 1 is an IR laser with a wavelength of 2058.69 nm. Under the action of the electrical field, a cathode of the parallel plate electrical excitation system 3 emits electrons in a field emission process. The electrons are accelerated towards an anode under the action of the electrical field and collide with helium atoms causing the helium atoms to ionize and to produce more electrons and ions. Collision between electrons, ions, and atoms finally excites the electrons in the helium atoms from the ground state to a 1s2s ($^1S_0$) intermediate state with 20.616 eV energy. The intermediate state is a metastable state. The electrons cannot decay to the ground state through dipole transition. Under the action of the parallel plate electrical excitation system 3, many helium atoms finally are in a metastable state with 20.616 eV energy. Then, when the IR laser with the wavelength of 2058.69 nm is incident on the helium medium, the helium atoms in the metastable state are excited to a 1s2p ($^1P_1$) excited state with 21.218 eV energy, and decay to the ground state, thereby emitting a DUV laser with 21.218 eV energy.

Embodiment 2

FIG. 2 is a schematic structural diagram of a laser according to this embodiment. The medium 2 is helium. The excitation system is a microwave excitation system 4. The excitation laser 1 is a visible laser with a wavelength of 501.57 nm. The microwave excitation system 4 provides a microwave to the medium 2. Under the action of a microwave electromagnetic field, the electrons in the helium atoms are excited from the ground state to the 1s2s ($^1S_0$) metastable state with 20.616 eV energy. In this case, when the visible laser with the wavelength of 501.57 nm is incident on the helium medium, the helium atoms in the metastable state are excited to a 1s3p ($^1P_1$) excited state with 23.087 eV energy, and decay to the ground state, thereby emitting a DUV laser with 23.087 eV energy.

Embodiment 3

FIG. 3 is a schematic structural diagram of a laser according to this embodiment. The medium 2 is helium. The excitation system is an electron gun excitation system 5. The excitation laser 1 is a UV laser with a wavelength of 266 nm. Under the bombardment of electrons emitted by the electron gun excitation system 5, the electrons in the helium atoms are excited from the ground state to the 1s2s ($^1S_0$) metastable state with 20.616 eV energy. In this case, when the UV laser with the wavelength of 266 nm is incident on the helium medium, the helium atoms in the metastable state are excited to a continuous excited state with 25.277 eV energy, and decay to the ground state, thereby emitting a DUV laser with 25.277 eV energy.

Embodiment 4

FIG. 2 is a schematic structural diagram of a laser according to this embodiment. The medium 2 is helium. The excitation system is a microwave excitation system 4. The excitation laser 1 is a visible laser with a wavelength of 515 nm. The microwave excitation system 4 provides a microwave to the medium 2. Under the action of a microwave electromagnetic field, the electrons in the helium atoms are excited from the ground state to the 1s2s ($^1S_0$) metastable state with 20.616 eV energy. In this case, when the visible laser with the wavelength of 515 nm is incident on the helium medium, the helium atoms in the metastable state decay to the ground state through a stimulated emission process, thereby emitting a DUV laser with 23.024 eV energy.

Embodiment 5

As shown in FIG. 2, an EUV laser with a shorter wavelength can be generated by using a cascade laser structure shown in FIG. 2. In the first laser, the medium 2 is helium, the excitation system is a microwave excitation system 4, and the excitation laser 1 is an IR laser with a wavelength of 2058.6 nm. As described in Embodiment 1, a DUV laser with 21.218 eV energy can be generated. A second laser structure as shown in FIG. 2 is connected to the rear of the first laser in a serial manner. In the second laser, the medium 2 is helium, the excitation system is the microwave excitation system 4, and the excitation laser 1 is a DUV laser with a wavelength of 58.44 nm (photon energy is 21.218 eV) generated by the first laser. The microwave excitation system 4 provides a microwave to the medium 2. Under the action of a microwave electromagnetic field, the electrons in the helium atoms are excited from the ground state to the 1s2s ($^1S_0$) metastable state with 20.616 eV energy. In this case, when the DUV laser with the wavelength of 58.44 nm is incident on the helium medium, the helium atoms in the metastable state decay to the ground state through a stimulated emission process, thereby emitting a EUV laser with 41.834 eV energy. If more laser structures shown in FIG. 2 are cascaded, EUV lasers with 62.45 eV energy, 83.066 eV energy, 103.682 eV energy, and 124.298 eV energy can be generated.

In summary, the present invention provides a laser, comprising: a medium, having a ground state, an intermediate state, and an excited state in ascending order of energy, where the excited state is a single level, multiple levels, or continuous levels state; an excitation system, configured to excite atoms in the medium from the ground state to the intermediate state; and an excitation laser, configured to drive the atoms in the intermediate state at different spatial positions in the medium to the ground state through the stimulated emission process with a fixed phase relationship. Since the excitation laser is used to drive the atoms from the intermediate state to the ground state, the photons generated by the stimulated emission have coherence, thereby forming a laser. In the present invention, an excitation system performing primary pumping combined with an excitation laser with a relatively long wavelength performing secondary pumping generate lasers with a relatively short wavelength, and the structure of the short-wavelength laser is simple, compact, and easy to be implemented. In addition, the cost of the short-wavelength laser can be reduced, and a laser with a shorter wavelength can be obtained. Therefore, the present invention effectively overcomes various disadvantages in the related art and has a high industrial value.

The foregoing embodiments merely exemplify the principles and effects of the present invention, but are not intended to limit the present invention. Any person skilled in the art may make modifications or changes on the foregoing embodiments without departing from the spirit and scope of the present invention. Therefore, all equivalent modifications or changes made by a person with ordinary skill in the art without departing from the spirit and technical idea of the present invention should be covered by the claims of the present invention.

What is claimed is:

1. A laser, at least comprising:
    a medium, having a ground state, an intermediate state, and an excited state in ascending order of energy, wherein the excited state is a single level, multiple levels, or continuous levels state;
    an excitation system, configured to excite atoms in the medium from the ground state to the intermediate state; and
    an excitation laser, configured to drive the atoms in the intermediate state at different spatial positions in the medium to the ground state through a stimulated emission process to generate coherent photons to form a laser, wherein there are two ways for the stimulated emission process, the first way is to excite the electrons in the intermediate state to the excited state and drive the electrons in the excited state to the ground state, and the second way is to directly drive the electrons in the intermediate state to the ground state;
    wherein the excitation system comprises an electromagnetic field excitation system or electron gun excitation system.

2. The laser according to claim 1, wherein the laser is a deep ultraviolet (DUV) laser.

3. The laser according to claim 1, wherein the intermediate state is a metastable state.

4. The laser according to claim 1, wherein the medium comprises a gas, a liquid or a solid.

5. The laser according to claim 4, wherein the medium comprises helium, neon, argon, krypton or xenon.

6. The laser according to claim 5, wherein the medium is helium, and energy of the intermediate state is 20.616 eV.

7. The laser according to claim 1, wherein the electromagnetic field excitation system comprises a static electromagnetic field excitation system, a pulsed electromagnetic field excitation system, an alternating current (AC) electromagnetic field excitation system, or a microwave excitation system.

8. The laser according to claim 1, wherein the excitation laser comprises a visible continuous wave laser, a visible pulsed laser, an infrared (IR) continuous wave laser, an IR pulsed laser, an ultraviolet (UV) continuous wave laser or a UV pulsed laser.

9. The laser according to claim 8, wherein wavelengths of the excitation laser comprise 329.86 nm, 335.60 nm, 344.90 nm, 361.52 nm, 396.67 nm, 501.6 nm, 2058.7 nm, and the wavelength shorter than 311.23 nm.

10. An N-stage cascade laser, wherein the N-stage cascade laser at least comprises a first-stage laser and a subsequent N-1-stage laser;
    the first-stage laser is the laser as in claim 1;
    a subsequent $i^{th}$-stage laser comprises:
    an $i^{th}$-stage medium, having a ground state, an intermediate state, and an excited state in ascending order of energy, wherein the excited state is a single level, multiple levels, or continuous levels state;
    an $i^{th}$-stage excitation system, configured to excite atoms in the $i^{th}$-stage medium from the ground state to the intermediate state;
    an $i^{th}$-stage excitation laser, wherein the $i^{th}$-stage excitation laser is an $i^{th}$-stage laser, a laser generated by the $i^{th}$-stage excitation laser is used to drive the atoms in the intermediate state at different spatial positions in the $i^{th}$-stage medium to the ground state through a stimulated emission process with a fixed phase relationship, to emit coherent photons to form an $i^{th}$-stage laser, wherein there are two ways for the stimulated emission process, the first way is to excite the electrons in the intermediate state to the excited state and drive the atoms in the excited state to the ground state, and the second way is to directly drive the atoms in the intermediate state to the ground state; and
    N is an integer greater than or equal to 2, and i is an integer greater than or equal to 2 and less than or equal to N.

* * * * *